United States Patent [19]

Ishiguro

[11] Patent Number: 5,321,386

[45] Date of Patent: Jun. 14, 1994

[54] RESISTOR ELEMENT

[75] Inventor: Fujio Ishiguro, Nagoya, Japan

[73] Assignee: NGK Insulators, Ltd., Nagoya, Japan

[21] Appl. No.: 836,883

[22] Filed: Feb. 19, 1992

[30] Foreign Application Priority Data

Mar. 13, 1991 [JP] Japan .................................. 3-074053

[51] Int. Cl.$^5$ .......................... H01C 1/02; H01C 3/04
[52] U.S. Cl. .................... 338/269; 338/25;
338/270; 219/553
[58] Field of Search .............. 338/269, 270, 25, 297,
338/27, 22 R; 219/552, 553

[56] References Cited

U.S. PATENT DOCUMENTS 4,069,465  1/1978  Kouchich et al. ................. 338/20
4,903,001  2/1990  Kikuchi ........................ 338/22 R
5,020,214  6/1991  Tsuruoka et al. ............... 338/269 X Primary Examiner—Marvin M. Lateef
Attorney, Agent, or Firm—Adduci, Mastriani, Schaumberg & Schill

[57] ABSTRACT

A resistor element includes a cylindrical, insulating ceramic substrate, a spiral resistor formed on said ceramic substrate, first and second lead wires inserted into the open ends of said ceramic substrate, a connector for making electrical connections between said resistor and said first and second lead wires, a layer of inorganic material which covers said ceramic substrate, said resistor and said connector, and a layer of resin material which covers the outer surface of said inorganic material layer. This resistor element is advantageously applied to a thermal type of flow rate sensor.

4 Claims, 4 Drawing Sheets

RESISTOR ELEMENT

BACKGROUND OF THE INVENTION

This invention relates to a resistor element and, more specifically, to a resistor element designed to detect the flow rate of a fluid.

As well known so far in the art, some resistor elements used for a thermal type of flow rate sensors adapted to detect the amount of intake air in automotive engines, etc. include an alumina pipe around which a thin film or wire of platinum is spirally wound and a lead wire electrically connected with this thin film or wire and connected to both ends of the alumina pipe. Such resistor elements are provided with a protecting layer on the thin film or wire of platinum so as to protect it. In general, the protecting layer is formed of glass whose surface is so smooth that heat exchange can take place efficiently between the resistor element and the flow of a fluid, e.g., air without disturbing the flow of the fluid.

However, problems with the conventional resistor elements are that even though the glass layer having a smooth surface is used as the protecting film, atmospheric soot, dust, oil, water, etc. are deposited onto the protecting film in the form of a layer, which then acts as a heat insulator, making heat exchange between the thin film or wire of platinum and the surrounding air stream worse. This will in turn result not only in deterioration of the output characteristics of the detection signal showing the flow rate of air but in a slow response of the detection signal as well.

Another type of flow rate sensors, e.g., a wire-heating type of flow rate sensor using a single wire of platinum as a heating wire, is known as well. In order to avoid dust deposition, dust or oil deposits are burned off by the heated wire.

However, the above heating technique cannot be applied to a resistor element having a glass protective layer, because the glass protective layer cannot stand up to high temperature. Nor can this technique be applied to a resistor element including a platinum film, because the platinum film breaks when exposed to temperatures so high as to burn off deposits. Hence, this heating technique cannot be applied to the present resistor element for flow rate sensors.

In order to solve these problems, this invention seeks to provide a resistor element which is so unlikely to adsorb atmospheric foreign matters such as dust that its responsiveness and output characteristics can be improved.

SUMMARY OF THE INVENTION

According to this invention, the above object is attained by providing a resistor element characterized by including a cylindrical, insulating ceramic substrate, a resistor formed on said ceramic substrate, first and second leads inserted into both open ends of said ceramic substrate, connectors for making electrical connections between said resistor and said first and second leads, an inorganic material layer adapted to cover said ceramic substrate, said resistor and said connectors, and a resinous material layer adapted to cover the outer surface of said inorganic material layer.

When the resistor element according to this invention is applied to a part through which a fluid flows, such as an air intake pipe in an internal combustion engine, it is the outer surface of this resistor element which the air flow contacts. That outer surface, because of being covered with the resin material, is unlikely to adsorb atmospheric soot, dust, water, oil, etc. Thus, such foreign matters are unlikely to form an insulating layer, which may otherwise give rise to substantial changes in the heat conductivity and capacity of said resistor element as well as in the heat exchange capability of said resistor element with an air flow; that is, there is neither a lowering of the resistor element's responsiveness nor a variation in the resistor element's output characteristics.

BRIEF DESCRIPTION OF THE DRAWINGS

This invention will now be explained specifically but not exclusively with reference to the accompanying drawings, in which.

DETAILED DESCRIPTION OF THE INVENTION

Figure 2:
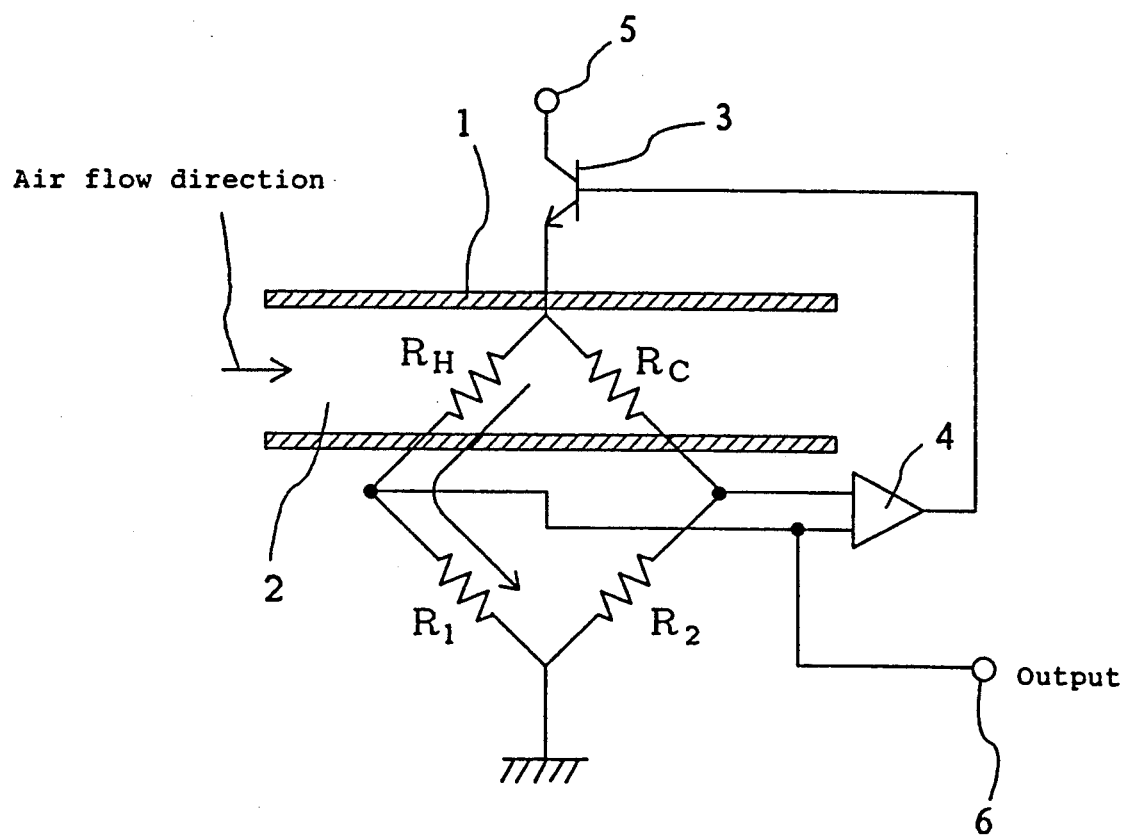
FIG. 2 is an electric circuit diagram of a thermal type of flow rate sensor in which the resistor element of this invention is built.

Now referring to FIG. 2 that is a typical electric circuit diagram of a thermal type of flow rate sensor with the resistor element of this invention built in it, a heat-generating resistor RH and a temperature-compensating resistor $R_C$ are located in an air pipe 1, while being brought in contact with an air flow through it. On the outside of an air passage 2, resistors $R_1$ and $R_2$ are connected with the resistors $R_H$ and $R_C$, respectively. The heat-generating resistor $R_H$ is provided to detect the flow rate of air, while the temperature-compensating resistor $R_C$ is maintained at the same temperature as that of the air flowing through the air passage 2. Bear in mind that reference numerals 3, 4 and 5 stand for a transistor, a comparator and a terminal to which a sensor-driving voltage is applied, respectively. An increase in the amount of the air flowing through the air passage 2 rids the heat-generating resistor element $R_H$ of much heat, resulting in decreases in its temperature and resistance value. The circuit depicted in FIG. 2 places the heat-generating resistor element under power control; it serves to make up for the decrease in resistance value by bridge balance and keep the heat-generating resistor element at a desired temperature. The terminal 6 is the output terminal of the flow rate sensor.

Figure 1:
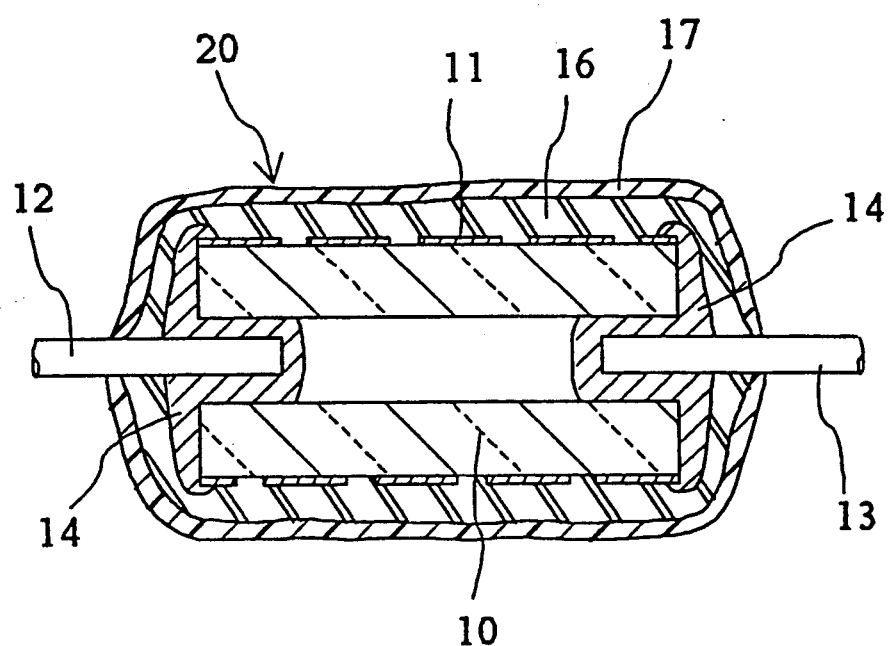
FIG. 1 is a sectional view illustrating one embodiment of the resistor element according to this invention.

The structure of the bridged heat-generating resistor $R_H$ and temperature-compensating resistor $R_C$ forming the above electric circuit is built up of such a resistor element as shown in FIG. 1. More specifically, a cylindrical ceramic pipe 10 formed of alumina or other material is provided on its outer surface with a patterned thin film 11 formed of a metal such as platinum and having a given resistance value. This thin film 11 is electrically connected at both ends of the ceramic pipe 10 with first and second lead wires 12 and 13 through an electrically conductive paste 14 obtained by mixing glass or other material with a conductor such as platinum. The thin film 11, for instance, may be formed on the outer surface of the ceramic pipe 10 by such physical or chemical procedures as sputtering, plating, CVD or vapor deposition, followed by heat treatment. The spiral patterning of the thin film 11, for instance, may be achieved by laser trimming. Around the thin film 11 on the ceramic pipe 10, there is provided a given thickness of a insulating protective film 16 formed of glass or other material. Provided to protect the thin film 11, the insulating protective film 16 may be formed of various types of glass or ceramics of high heat conductivity, such as alumina or beryllia. According to this invention, however, any other desired material may be used as well. This insulating protective film 16, for instance, may be formed by dipping in a glass slurry, etc., sputtering, plating, CVD, vapor deposition or other procedure.

Figure 3:
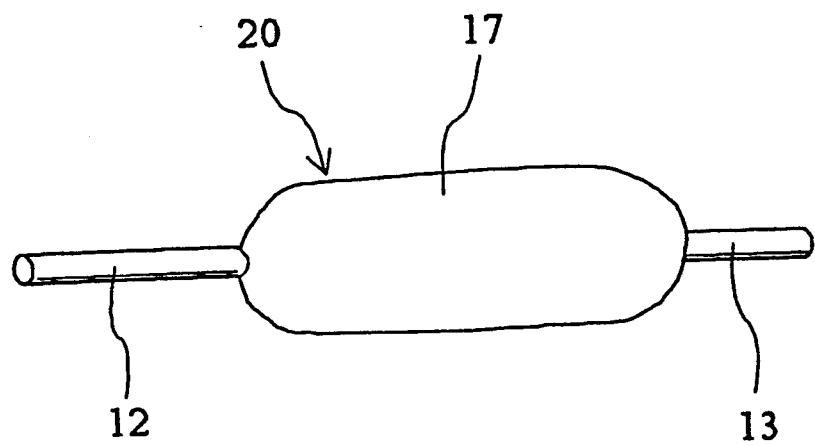
FIG. 3 is a perspective view of the resistor element according to this invention.

Then, the insulating protective film 16 is provided around it with a resinous material layer 17, e.g., a plastic film. It is desired that polyimide, fluoroplastic or other resins be used as the plastics. Especially because of its excellent heat resistance, the polyimide is best suited for a resistor element used at relatively high temperatures (of, e.g., 200° to 300° C.). The polyimide also serves well to prevent adsorption of oily and watery dusts due to its oil and water repellencies. The fluoroplastics are, on the other hand, best suited for a resistor element used at a temperature up to 200° C. Especially when the fluoroplastics are used for the temperature-compensating element rather than for the heat-generating resistor element, they can exhibit their own performance well; they continue to exert their water and oil repellencies over an extended period of time. Since the resin material layer 17 is provided to repel oil and water, its thickness should preferably be as thin as possible. For instance, its thickness should lie in the range of 0.5 to 20 μm, preferably 1 to 5 μm. Inherently, the plastic material layer 17 is better than glass not only in the capability to prevent adsorption of dust but also in corrosion resistance and water resistance as well. In addition, the plastic material layer 17 can be well handled during production, because it can be easily formed by dipping, or other physical or chemical means. Since the resistor element 20 is covered on its outer surface with the resin material layer 17, as shown in FIG. 3, it is unlikely to adsorb soot, dust, water and other foreign matters, when it comes in contact with air or other fluids; the heat exchange capability of the heat-generating resistor element remains in good condition. Thus, this resistor element can be used for a flow rate sensor to prevent variations in its responsiveness, etc.

In what follows, this invention will be explained at great length with reference to the following examples.

EXAMPLE 1

After washing, an alumina pipe (shown at 10 in FIG. 1) formed of alumina with a 96% purity and having an inner diameter of 0.25 mm, an outer diameter of 0.6 mm and a length of 2.5 mm is sputtered thereon with platinum. The thus deposited platinum is heat-treated with the alumina pipe and then laser-trimmed into a spiral thin film of platinum having a given resistance value. The heat-generating and temperature-compensating resistor elements may have a resistance value lying in the range of 10-50Ω and 50-1,000Ω, respectively.

Stainless wires having an outer diameter of 0.2 mm are inserted into both open ends of said alumina pipe with a mixed paste of platinum with glass and the paste is baked, whereby they are electrically connected with the platinum film 11, providing first and second lead wires (shown at 12 and 13 in FIG. 1).

The body of the thus obtained heat-generating or temperature-compensating resistor element is then provided around it with an insulating protective layer. When glass is used for the insulating protective layer, glass slurry is prepared by dispersing glass powders in a solution in which a small amount of binder is dissolved. The element body is dipped in the glass slurry dispersion and then pulled up, followed by the evaporation of the solvent in a drying oven. After drying, the glass is melted at a given temperature in a given atmosphere to form a glass layer. This glass layer covers the platinum film and the rectangular ends and corners of the alumina pipe, thus providing a smooth surface. This smoothness is useful for making the thickness of the polyimide or fluoroplastic film uniform and enhancing the water and oil repellencies thereof. In general, temperatures of about 500°-700° C. and about 700°-800° C. are needed for lead glass and borosilicate glass, respectively. While the glass slurry is applied by dipping in this example, it may also be applied by brushing, spinning, RF sputtering or other means.

When ceramics such as alumina and zirconia are used for the insulating protective film, on the other hand, a small amount of glass powders are added to the ceramic powders (as in the case with glass), which are then dispersed in a solution having a small amount of binder dissolved in it to prepare paste. This paste may in turn be applied onto the resistor element body. Alternatively, the above ceramics may be RF-sputtered directly onto the resistor element body using its plate as a target, thereby forming the protective film.

Subsequently, the polyimide layer is formed on the insulating protective film. To this end, the heat-generating or temperature-compensating element is dipped in a feed solution which is converted into polyimide by heat treatment, pulled up and finally heat-treated. The heat treatment may be carried out at a temperature of about 200°-500° C. and, if required or preferred in a neutral atmosphere. In order to control the film thickness during one dipping cycle, the concentration of the solution may be regulated. Two or more dipping cycles are preferred for preventing the occurrence of pinholes, etc.

EXAMPLE 2

Fluoroplastic is formed on the insulating protective film on the heat-generating or temperature-compensating element prepared in Example 1. To this end, the element was brushed with a fluoroplastic liquid and then heat-treated at 100°-200° C. for drying. The film thickness was controlled by the concentration of the fluoroplastic liquid and the number of brushing. FIG. 3 represents the appearance of the heat-generating resistor element having the resin layer 17.

In Examples 1 and 2, the resin layer was formed directly onto the insulating protective film. However, when it is desired to enhance the adhesion of the resin to the film substrate, treatments with a primer, etc. may optionally be carried out.

Alternatively, when the insulating protective film is formed of glass, the glass may be semi-melted to undulate its surface. Since the ceramic film is not so smooth in the surface as the glass film (esp., that formed by RF sputtering), it has another advantage of showing a stronger adhesion to the resin.

Set out below are the results of estimation of some elements made as to the state in which foreign matters are deposited onto them and their durabilities.

ESTIMATION EXAMPLE 1

Figure 5:
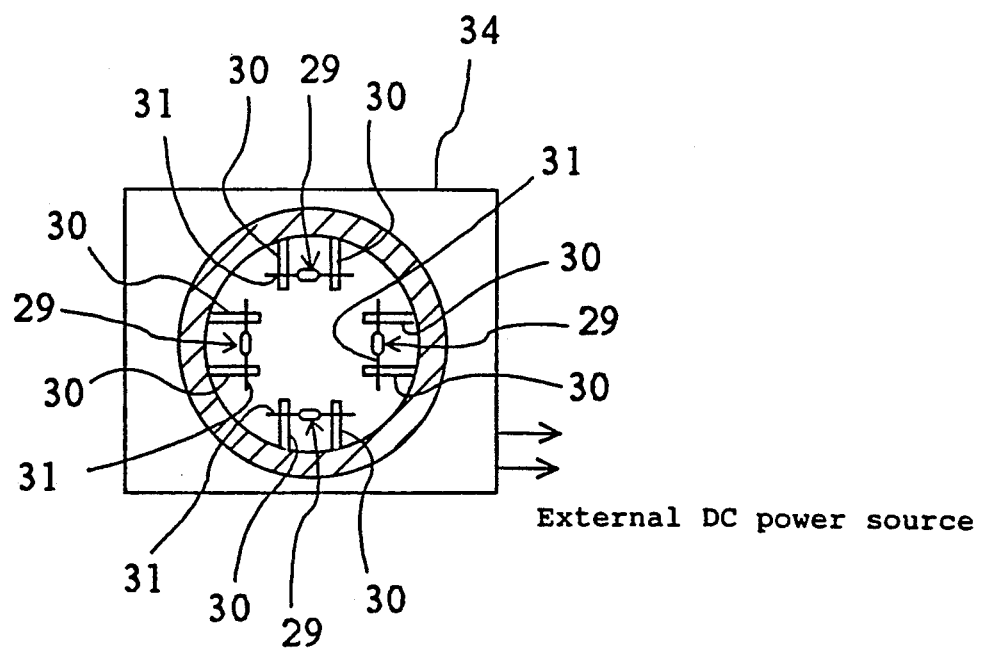
FIG. 5 is a schematic view showing the A—A' section of a portion to which an element sample is attached.

As can best seen from FIG. 5, each sample 29 to be estimated is fixed to thick stainless rods 30 by welding the lead wires 31 thereto. Of the samples 29, the heat-generating resistor element is controlled to 200° C. by a given power supplied from an external DC power source. No power is supplied to the temperature-compensating element.

Figure 4:
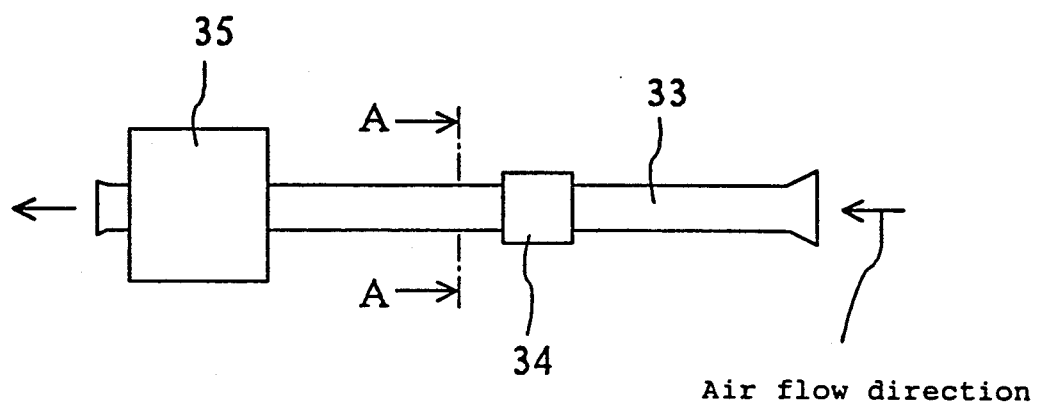
FIG. 4 is a schematic view illustrating how to estimate element samples.

As shown a portion 34 to which an element sample is attached in FIG. 4, each sample 29 is located within a stainless pipe 33 (having an internal diameter of 50 mm). A blower 35 is capable of feeding air at a flow rate of 30 g/sec. The results of estimation are set out in Table 1. This estimation was made in an atmosphere containing large quantities of soot, dust, oil mist, etc.

TABLE 1

| Element Samples | Thickness | Heating | 100 hours | 500 hours |
| --- | --- | --- | --- | --- |
| Glass + Polyimide | 8 μm + 5 μm | Done | ND | ND |
| Glass + Fluoroplastic | 10 μm + 6 μm | Done | ND | ND |
| Polyimide coated directly on platinum film | 7 μm | Done | ND | ND |
| Glass | 10 μum | Done | ND | D |

ND: No deposition found.
D: Foreign matters were deposited onto the sample on the windward side.

Similar experiments were carried out without heating. The results were the same as those obtained with heating.

ESTIMATION EXAMPLE 2

Dipped in hot water were element samples obtained by applying polyimide and fluoroplastic on glass in a thin layer form of 1-3 μm in thickness and comparative samples obtained by applying polyimide and fluoroplastic on platinum films in a thin layer form of 1-3 μm in thickness, whereby an accelerated estimation was made of to what degree the resin films peeled off. After the lapse of 50 hours or more, the resin films formed directly on the platinum films were off in places, but the resin films on the glass showed durability by factor of two or more.

As can be understood from Estimation Examples 1 and 2, the heat-generating and temperature-compensating resistor elements according to this invention have an effect on preventing deposition of foreign matters and are practically durable.

According to the heat-generating resistor of the present invention which includes thereon a layer of inorganic material, e.g., glass, so as to protect it and a layer of resin material on the surface of said layer of inorganic material, as explained above, its heat exchange capability can be well maintained, because it is unlikely to adsorb atmospheric foreign matters such as soot, dust and water. A thermal type of flow rate sensor with this resistor element built in it would serve well over an extended period of time and could detect changes in flow rates and temperatures at a rapid speed and with high accuracy.

I claim:

1. A heat-generating resistor element for use in a thermal-type flow rate sensor comprising:
   a cylindrical, insulating ceramic substrate,
   a spiral heat-generating resistor formed on said ceramic substrate,
   first and second lead wires inserted into both open ends of said ceramic substrate,
   a connector for making electrical connections between said resistor and said first and second lead wires,
   a layer of inorganic material which covers said ceramic substrate, said resistor and said connector, and
   a layer of an oil and water repellant polyimide or fluoroplastic resin which covers the outer surface of said inorganic material layer.

2. A resistor element according to claim 1, wherein said ceramic substrate is made of alumina.

3. A resistor element according to claim 1, wherein said connector is made of electrical conductive paste.

4. A resistor element according to claim 1, wherein said layer of polyimide or fluoroplastic resin has a thickness selected within a range of 0.5-20 μm.

* * * * *